(No Model.) 7 Sheets—Sheet 3.
P. GALLAS.
SAND MOLDING MACHINE.
No. 356,872. Patented Feb. 1, 1887.
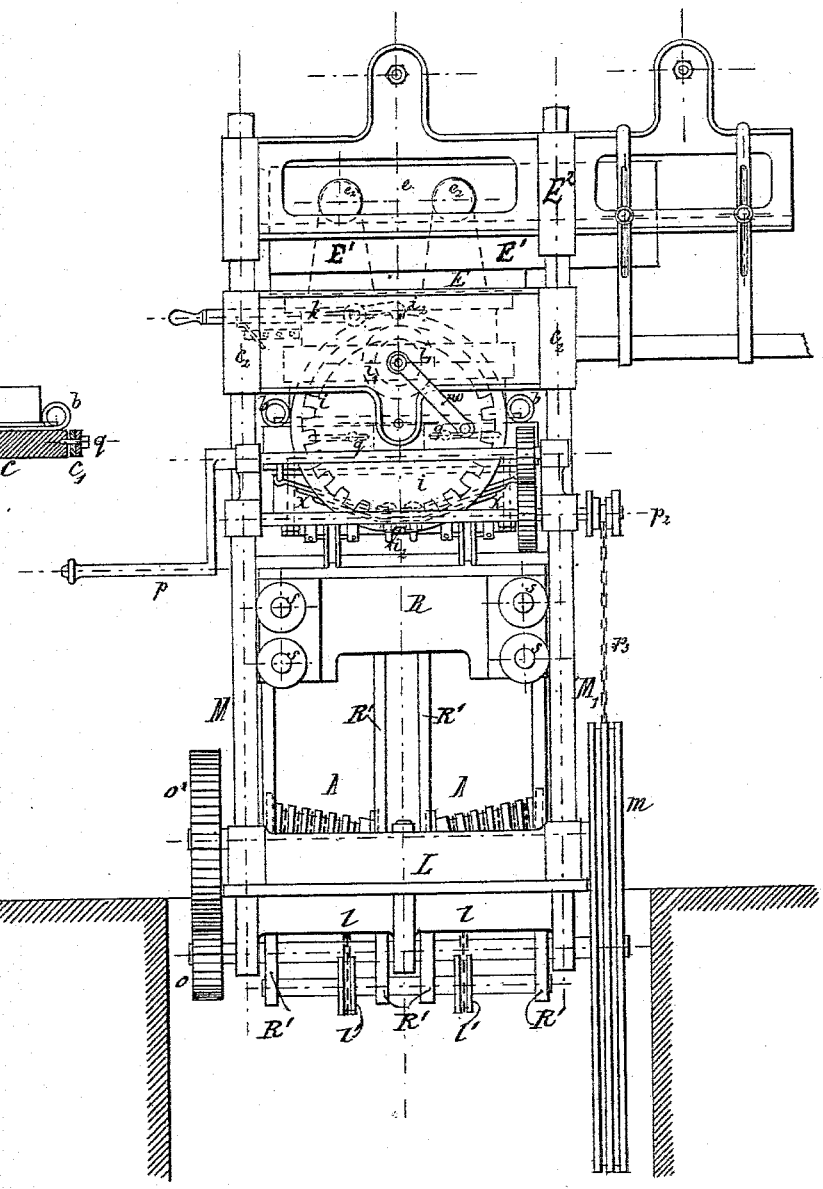

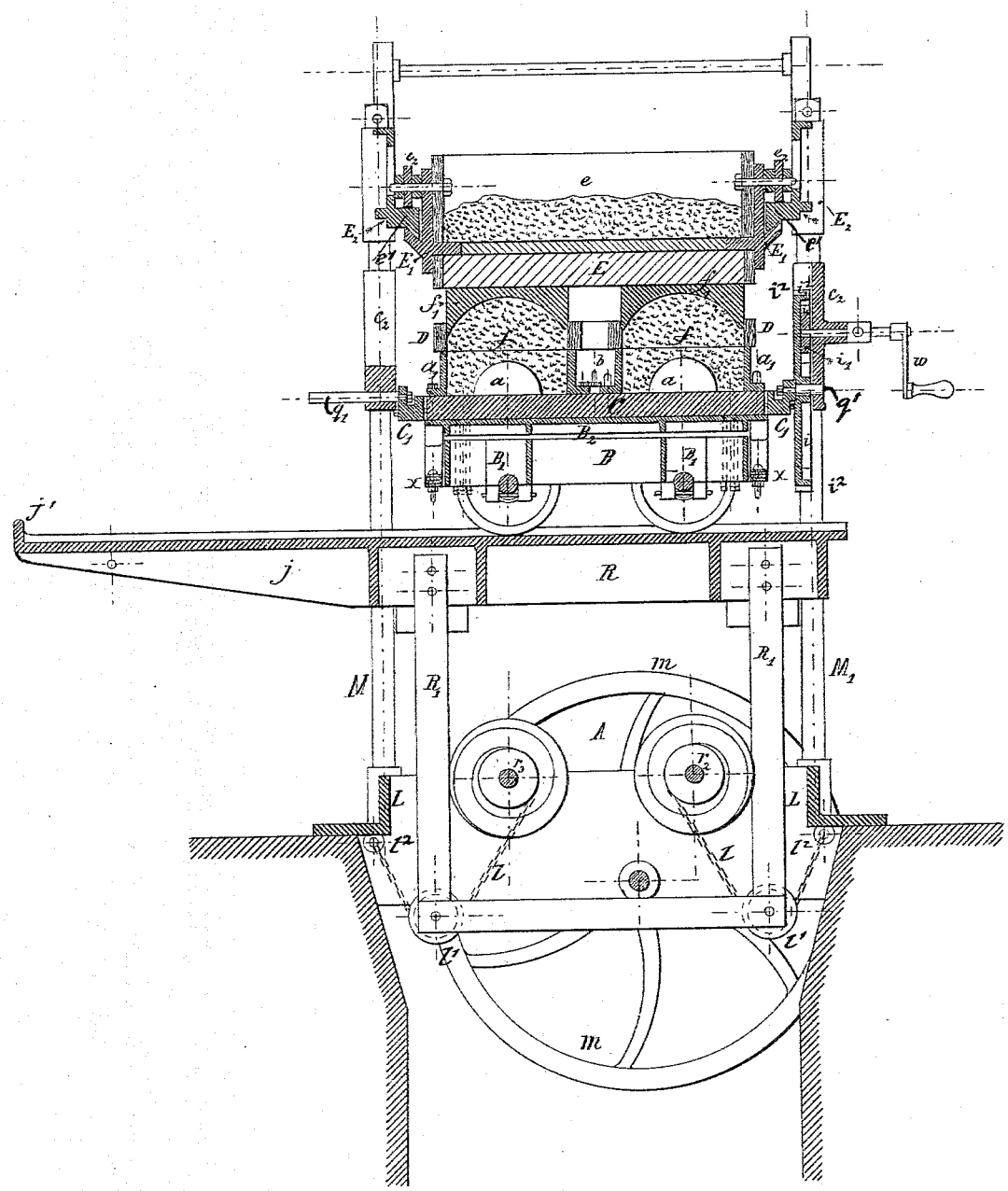

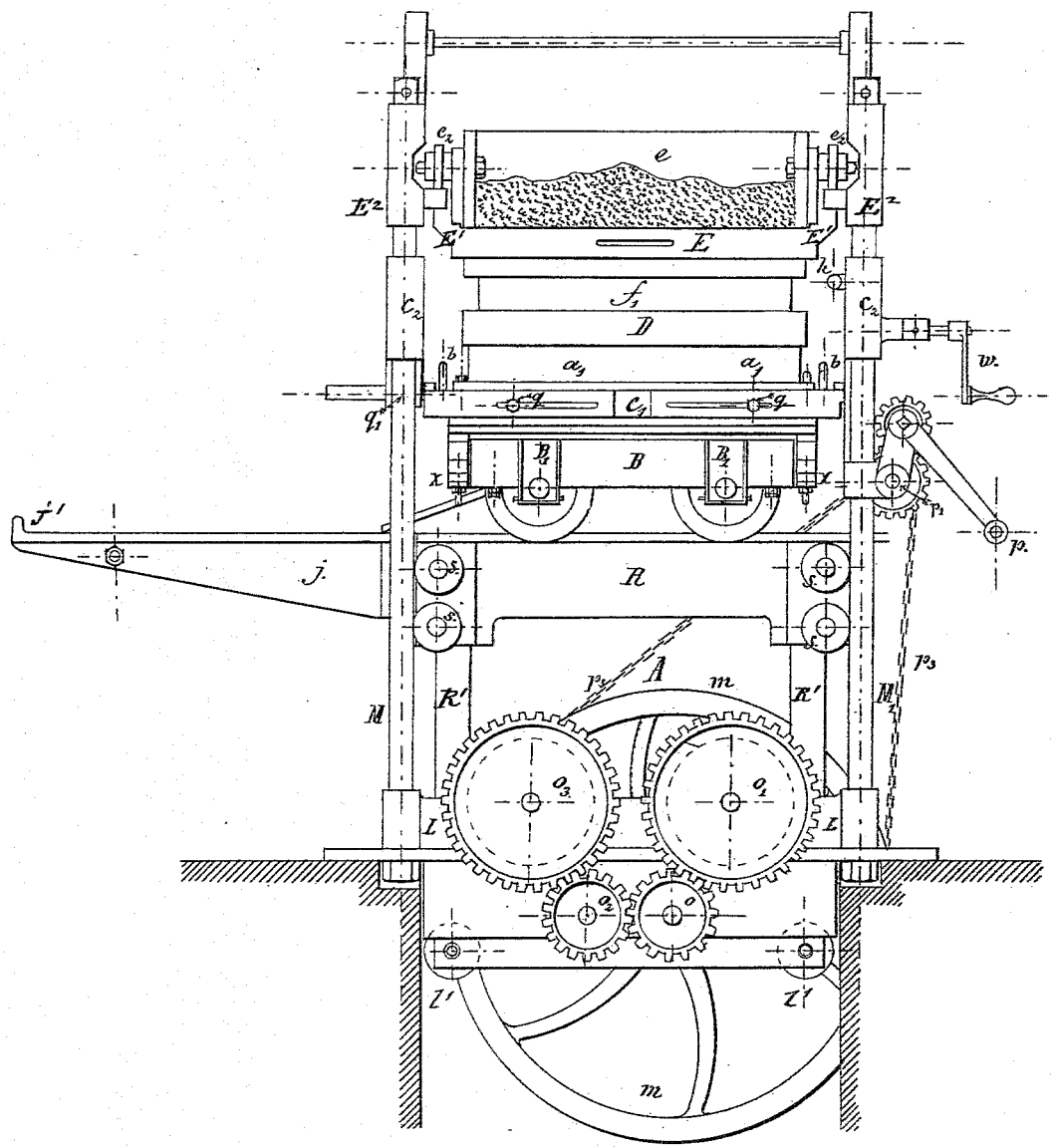

(No Model.) 7 Sheets—Sheet 4.
P. GALLAS.
SAND MOLDING MACHINE.
No. 356,872. Patented Feb. 1, 1887.
Fig. V.
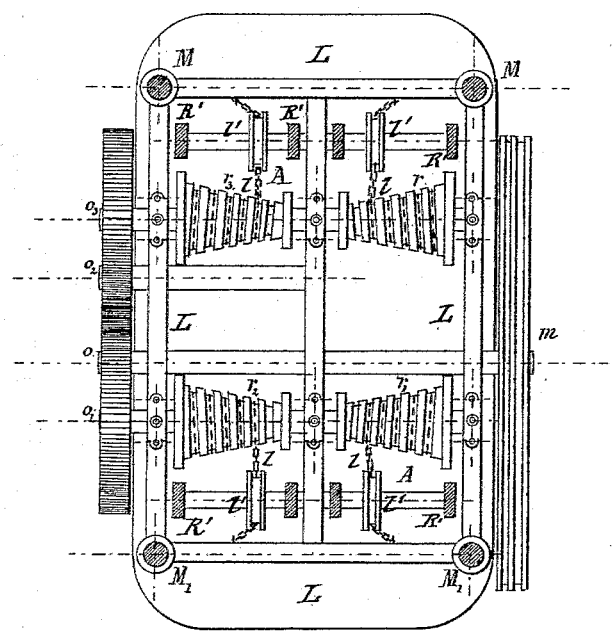
Fig VI
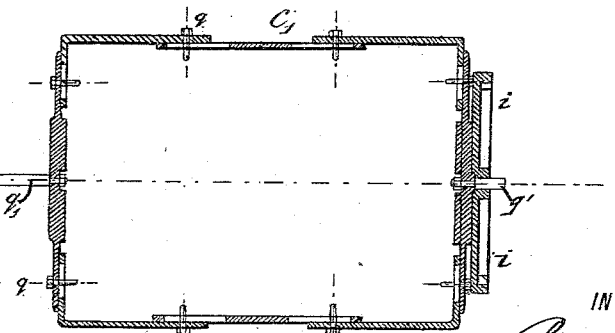
WITNESSES: INVENTOR
Ernst Wolff Peter Gallas
Carl Kopp BY
Goepel & Raegener
ATTORNEYS.

(No Model.) 7 Sheets—Sheet 5.
P. GALLAS.
SAND MOLDING MACHINE.
No. 356,872. Patented Feb. 1, 1887.
Fig. VII.
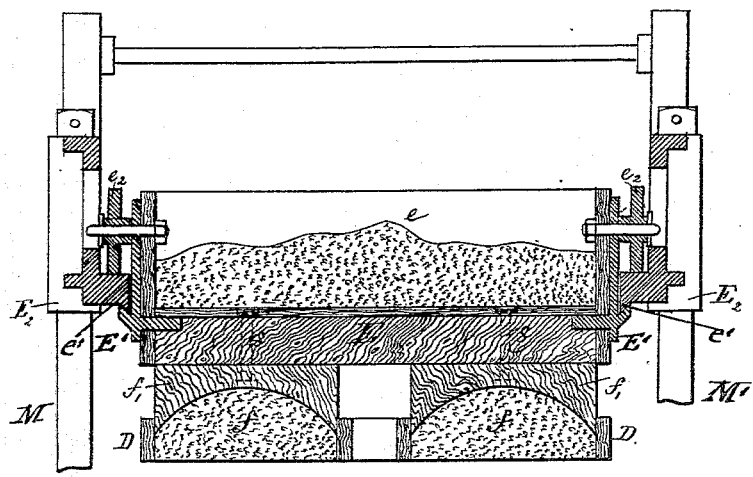
Fig. VIII.
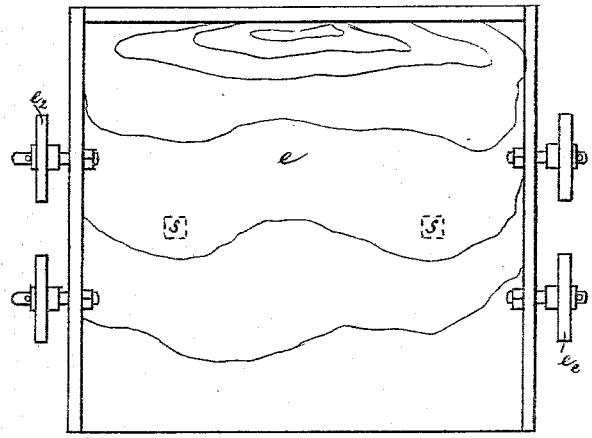
WITNESSES:
INVENTOR
Peter Gallas
BY
ATTORNEYS (No Model.)
P. GALLAS.
SAND MOLDING MACHINE.
No. 356,872. Patented Feb. 1, 1887.
Fig. IX.
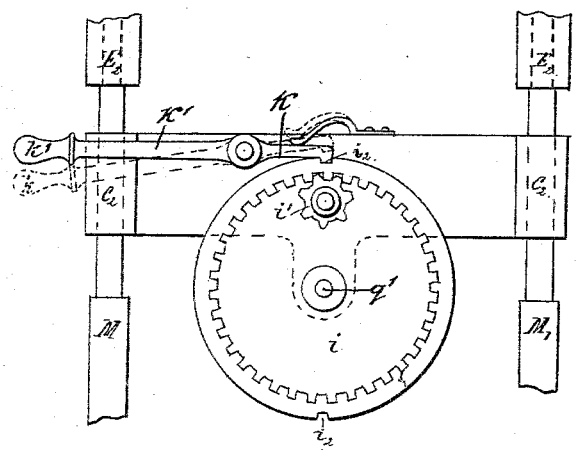
Fig. X.
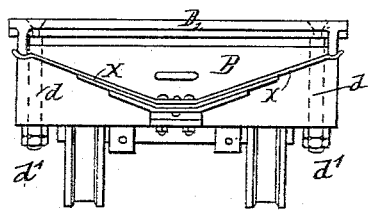
Fig. XI.
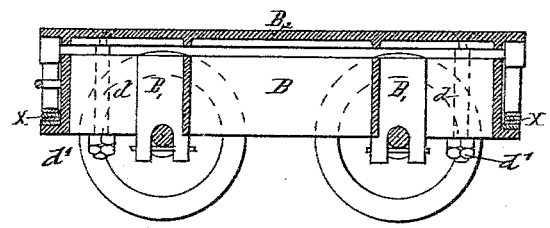

(No Model.) 7 Sheets—Sheet 7.
P. GALLAS.
SAND MOLDING MACHINE.
No. 356,872. Patented Feb. 1, 1887.
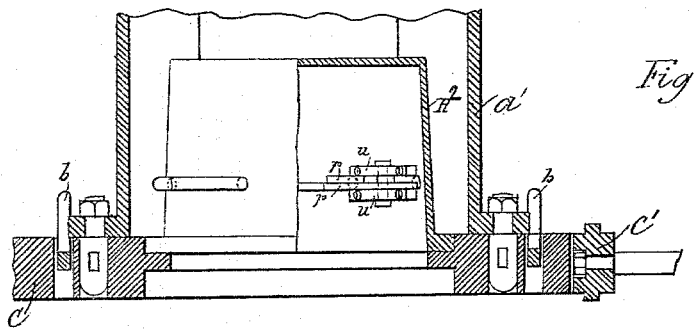
Fig. XII.
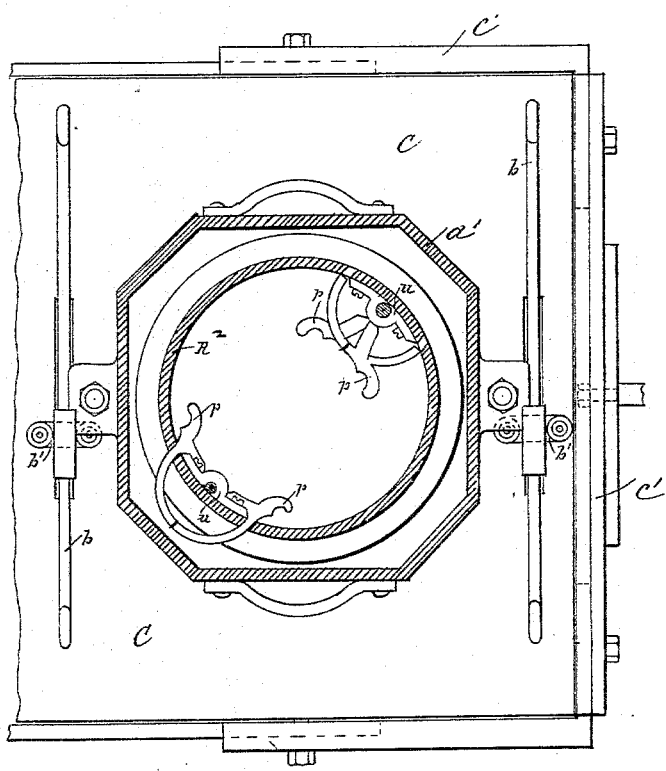
Fig. XIII.
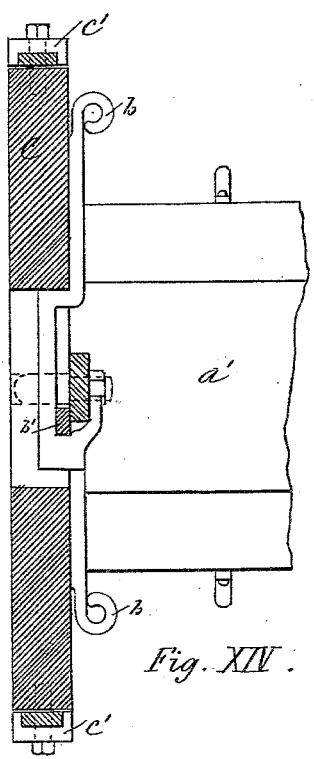
Fig. XIV.
WITNESSES:
INVENTOR
Peter Gallas
BY
ATTORNEYS.

UNITED STATES PATENT OFFICE.

PETER GALLAS, OF LANCASTER, PENNSYLVANIA.

SAND-MOLDING MACHINE.

SPECIFICATION forming part of Letters Patent No. 356,872, dated February 1, 1887.

Application filed August 7, 1885. Serial No. 173,822. (No model.)

*To all whom it may concern:*

Be it known that I, PETER GALLAS, of Lancaster, in the county of Lancaster and State of Pennsylvania, have invented certain new and useful Improvements in Molding-Machines, of which the following is a specification.

This invention relates to an improved molding-machine; and it consists of a vertically-movable press-table and mechanism for lifting the same, said mechanism consisting of conical drums, chains winding on said drums, and transmitting-gearing for imparting rotary motion in opposite direction to said drums. On the press-table is supported a laterally-movable carriage that carries the pattern-plate and pattern-box, said pattern-plate being inclosed by an adjustable frame that is turned by a suitable gear-wheel mechanism operated by a hand-crank. Above the pattern-box is arranged the laterally-movable press-frame and press-cover with press-blocks and a box for the molding-sand. The press-cover is supported on wheels and guided on ways of fixed brackets of the supporting-pillars of the machine.

The invention consists, further, of certain details of construction and combination of parts, which will be more fully described hereinafter, and finally pointed out in the claims.

In the accompanying drawings, Figure 1 represents a vertical longitudinal section of my improved molding-machine. Fig. 2 is a front elevation, and Fig. 3 is a side elevation, taken from the right of the apparatus. Fig. 4 is a detail vertical transverse section, showing the connection of the pattern-box, pattern-plate, and frame of the turning mechanism. Fig. 5 is a plan of the mechanism for lifting the press-table. Fig. 6 is the horizontal section of the adjustable frame for turning the pattern-box and pattern-plate. Fig. 7 is an enlarged detail cross-sectional view of the sand-box, press-cover, and banking-frame. Fig. 8 is a plan view of the sand-box. Fig. 9 is an enlarged detail side view of the gearing for revolving the frame in which the patterns are held. Fig. 10 is an end view of the carriage. Fig. 11 is a longitudinal sectional view of the same. Fig. 12 is a cross-sectional view of the pattern-box and a pattern in the same. Fig. 13 is a horizontal sectional view of the same, and Fig. 14 is a cross-sectional view of the same.

Similar letters of reference indicate corresponding parts.

Referring to the drawings, A represents the mechanism by which the press-table R is moved; B, the carriage having a vertically-movable plate, $B^2$, for loosening the patterns; C′, the vertically-adjustable frame for turning the pattern-box and pattern-plate; D, the banking-frame; E, the movable press-cover; $e$, the box for the molding-sand, and $E^2$ the supports of the guide-frame.

The sand-box $e$ (shown in Figs. 7 and 8) has three side walls, one open side, and a closed bottom.

The entire molding-machine is supported on a rectangular bed-frame, L, of suitable cross-section, that is open at the center, and which supports at the corners four upright wrought-iron main pillars, M and M′, which are connected at their upper ends by suitable braces. The pressing of the patterns is effected by the press-plate R and the lifting apparatus A, which latter is operated by a crank, $p$, that imparts motion by a gear-wheel transmission-chain, $p^3$, and sprocket-wheels $p^2$ and $m$ to four spirally-grooved conical drums, $r\ r'\ r^2\ r^3$, which are supported in bearings of the bed-frame L. On the shaft of the sprocket-wheel $m$ is arranged a pinion, $o$, which meshes with a gear-wheel, $o'$, on the shaft of the conical drums $r'\ r^2$. The pinion $o$ also meshes with a second pinion, $o^2$, arranged sidewise of the former, which pinion $o^2$ meshes with a gear-wheel, $o^3$, of the same size as the gear-wheel $o'$. The gear-wheel $o^3$ is keyed to the shaft of the conical drums $r\ r^3$, as will be readily seen by Figs. 2 and 5.

By the chain and sprocket-wheel transmission described the cone-drums $r\ r'\ r^2\ r^3$ are turned in opposite direction to each other. To the cone-drums are attached chains $l\ l$, which pass over pulleys $l'\ l'$ at the lower ends of transversely-connected auxiliary pillars R′, and then to fixed rings $l^2$ of the bed-frame L. The auxiliary pillars R′ are rigidly attached at their upper ends to the press-table R, so as to lift the same and thereby the carriage B.

The use of the spirally-grooved cone-drums has the advantage that at the beginning of the lifting motion the chains are wound around the ends of the drums having the largest diameter, so as to exert, when winding up on the larger ends, a comparatively small pressure, but a quick lifting action. This is gradually reversed as the chains are wound up on the smaller ends of the drums, whereby, at the same speed of rotation, great pressure connected with small lifting action is produced. The peculiarity of this lifting mechanism is that by a uniform turning of the crank $p$ the press-table is lifted rapidly at the commencement of its motion, while at the termination of its upward motion the lifting motion is slackened and the patterns exposed to increased pressure, according to the nature of the sand to be pressed, so that with but a few rotations of the crank and small expenditure of force the lifting mechanism produces a quick lifting motion and great pressure. The press-table R is steadily guided in its vertical motion by rollers $s\ s$, which move along the main pillars M M'. The press-table R is provided with sidewise-extending brackets $j$, having an outer stop-flange, $j'$, which brackets form an extended way on which the carriage B can be pushed out of the way when it is desired to turn the pattern-plate.

The carriage B is provided with axle-boxes B' at the lower part and a vertically-movable plate, $B^2$, that is supported on powerful springs $x$, of which one is arranged at each end of the carriage B. Said springs $x$ are formed of a number of leaves in the nature of carriage-springs, which springs carry the plate $B^2$ on their four ends, as shown in detail in Figs. 10 and 11. The plate $B^2$ has a guide-pin, $d$, at each corner, which pins are passed vertically through the frame of the carriage B, and provided at their lower ends with nuts and jam-nuts $d'$, for checking and limiting the upward movement of the plate $B^2$.

The patterns $a\ a$ are inclosed by the flask $a'$, which is locked to the pattern-plate C by sliding bolts or latches $b\ b$, as shown in Figs. 12, 13, and 14, which bolts are held in place so that they can only slide in the direction of their length by clips $b'$ passed through the slots or latches of said bolts. On the pattern-box $a'$ the banking-frame D rests, which serves to fill in the molding-sand $f$. The banking-frame D is made equal to the inner size of the pattern-box and constructed of wrought-iron plates. It serves to guide the press-blocks $f'$ $f'$, upon which is placed the press-cover E, that is made of a strong frame of cast-iron, to which are screwed strong wooden planks, to which latter are screwed the press-blocks $f'\ f'$.

The pattern-plate C is surrounded and supported by an adjustable frame, C'. (Shown in detail in Fig. 6.) The frame C' is provided with the clamping-screws $q$, for being firmly attached to the pattern-plate C. The frame C' can be readily adjusted to a greater or smaller size, as it is made of four corner-pieces and four side pieces connected by the above-mentioned clamping-screws $q$, so that the frame C' can be used for smaller or larger pattern-plates.

In case the article to be molded is not too large for the machine, two half-flasks are attached to the same side of the pattern-plate; but when the pieces are too large two machines are used, and one flask is used in each machine.

The pattern-frame C' is supported by center pivots, $q'$, in bearings of plates connecting the sleeves $C^2$, which latter are guided on the pillars M M', as shown in Figs. 1, 4, and 9. The pivot $q'$ at the left-hand side of the frame C' is made longer than the pivot $q'$ at the right-hand side of the frame C', so as to permit the inward shifting of the left-hand part of the frame C'. To the right-hand pivot $q'$ is keyed a flanged interiorly-toothed gear-wheel, $i$, meshing with a pinion, $i'$, on a crank-shaft, $w$, that turns in bearings of the sleeve $C^2$. A pawl, $k$, provided with the handle, $k'$, is pivoted to the sleeve $C^2$ and locks into circumferential recesses $i^2$ of the flanged gear-wheel $i$, as shown in Figs. 3 and 9. By turning the crank-shaft $w$ the pattern-plate C, frame C', and pattern-box $a'$ are turned, which has the advantage that the patterns are accessible, and also that objects with laterally-projecting portions can be formed, which is the special advantage of my machine.

In Figs. 12, 13, and 14 I have shown the method of molding an iron pot. The molds $p$ for the handles are pivoted on hinged plates $u$, the latter being fastened by screws to the pattern-plate $R^2$. On the left-hand side of Fig. 13 the handle-patterns are in the position they have during the process of forming or pressing, and on the right-hand side the handles are adjusted toward the interior, so that the outer side of the presser is entirely free and the mold can be removed from the same without any difficulty. The press-cover E is provided with beveled side rails, E', which are guided along correspondingly-shaped rails $e'$ of the supports $E^2$. The press cover is supported by four wheels, $e^2$, which are guided on the rails $e'$, so that it can be moved sidewise on the same. The rails $e'$ are extended sidewise to give sufficient space for moving the press-cover and banking frame entirely out of the way. In this position they are supported on an extension of the supporting frame, which is provided with vertically-adjustable hanger-bars, as shown (but not lettered) in Fig. 4.

The operation of molding one half of the mold is effected in the following manner: The carriage B is placed on the brackets $j\ j$, and the press-cover E and sand-box $e$ moved sidewise on the rails $e'$, so as to clear the space above the pattern-plate C. One half of the flask $a'$ is put on the pattern-plate C and fastened to it by means of the bolt-clips $b\ b$. The patterns are then placed in position on the pattern-plate C. The banking-frame D is then placed on the pattern-box $a'$ and enough molding-sand sifted upon the patterns until they are covered. Then by means of a suitable shovel an additional quantity of sand is taken from the open end of the sand-box $e$, so as to fill evenly the pattern-box and banking-frame. The press-cover E, with the press-blocks $f'$, is now moved on the rails $e'$ into a position vertically above the pattern-box. The carriage B, which has been at rest on the brackets $j$, is next moved below the pattern-plate C. The lifting mechanism A is then set in motion, so that the press-table R is lifted with the carriage B, together with the turning-frame $C'$, pattern-plate C, and flask $a'$, and pressed against the press-cover E, whereby the pressing of the mold is effected. The press-table R is then again lowered as much as is required to allow the turning apparatus to return to its resting-place, upon which the carriage B becomes free. The carriage B is then moved forward on the brackets $j$, and the press cover E, with the press-blocks $f'$, and banking-frame D, moved sidewise out of the way. The sand remaining above the level of the pattern-box $a'$ is removed or trimmed off and the surface smoothed. The handle $k'$ of the pawl $k$ is then lifted by one hand until the pawl $k$ is released from the recess or notch $i^2$ of the turning apparatus, while the other hand turns the crank-shaft $w$, and thereby the pattern-plate C, frame $C'$, and the flask $a'$, far enough until the pawl $k$ drops in the corresponding recess or notch $i^2$ at the opposite side of the gear-wheel $i$, whereby the pattern-box is suspended in inverted position from the pattern-plate. The carriage B is then moved again below the pattern-box and lifted high enough to support the same. The bolts $b\ b$, which fasten the pattern-box to the pattern-plate, are then pulled. Then by means of gentle raps on the back side of the pattern-plate, and by very slowly letting down the press-table, the adhesion of the mold and patterns is broken, after which the pattern-box is let down quickly, so that patterns are entirely liberated from the mold. The carriage B is then pulled out again, together with one half of the flask, in which perfectly-finished mold is obtained. The pattern-plate is then turned back again into its former position by the crank-shaft, and the next mold made in the same manner, and so on. The other half of the mold, or the upper part of the box, is molded in the manner described on a second machine, with only this exception, that the pouring-gate and raisers must be molded in the upper part, so that two half-boxes belonging to each other are finished simultaneously. These two half-boxes are then transferred to a suitable automatic box-adjusting apparatus, and closed preparatory to casting.

Having thus described my invention, I claim as new and desire to secure by Letters Patent—

1. In a molding-machine, the combination of a supporting bed-frame, upright pillars, auxiliary pillars, a press-table supported on the auxiliary pillars, spirally-grooved cone-drums, supporting-chains passing from the drums below the auxiliary pillars to the bed-frame, and motion-transmitting mechanism by which the cone-drums are turned and the press-table raised or lowered, substantially as set forth.

2. In a molding-machine, the combination of the bed-frame L, upright pillars M M', auxiliary pillars R' R', a press-table, R, having guide-rollers $s\ s$, chains $l\ l$, conical drums $r\ r'\ r^2\ r^3$, transmitting gear-wheels $o\ o'\ o^2\ o^3$, sprocket-wheels $m\ p^2$, chain $p^3$, and crank-shaft $w$, substantially as set forth.

3. In a molding-machine, the combination of a pattern-plate, a pivoted and longitudinally-adjustable pattern-plate frame, a flask, mechanism for attaching the flask to the pattern-plate, and gearing for turning the pattern-plate on its axis, substantially as set forth.

4. In a molding-machine, an open pattern-plate frame formed of corner-pieces, adjustable side pieces, clamping-screws, and central pivots attached to end pieces, substantially as set forth.

5. In a molding-machine, the combination of a pattern-plate, C, a flask, $a$, and sliding bolt-clips $b\ b$, for fastening the pattern-box to the pattern-plate, substantially as set forth.

In testimony that I claim the foregoing as my invention I have signed my name in presence of two subscribing witnesses.

PETER GALLAS.

Witnesses:
B. F. GROFF,
A. S. GUINEY.